(12) United States Patent
Vanni et al.

(10) Patent No.: US 9,010,507 B2
(45) Date of Patent: Apr. 21, 2015

(54) TORQUE CONVERTER WITH A CLUTCH CENTERING FEATURE

(71) Applicant: Schaeffler Technologies AG & Co. KG, Herzogenaurach (DE)

(72) Inventors: Jeremy Vanni, Sterling, OH (US); Brian C. Zaugg, Millersburg, OH (US); Rolf A. Mueller, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 138 days.

(21) Appl. No.: 13/778,520

(22) Filed: Feb. 27, 2013

(65) Prior Publication Data

US 2013/0233665 A1 Sep. 12, 2013

Related U.S. Application Data

(60) Provisional application No. 61/607,148, filed on Mar. 6, 2012.

(51) Int. Cl.
*F16H 45/02* (2006.01)
*F16D 33/18* (2006.01)
*F16F 15/00* (2006.01)
*F16H 41/24* (2006.01)

(52) U.S. Cl.
CPC ............... *F16D 33/18* (2013.01); *F16F 15/00* (2013.01); *F16H 41/24* (2013.01); *F16H 45/02* (2013.01); *F16H 2045/0205* (2013.01); *F16H 2045/0226* (2013.01); *F16H 2045/0278* (2013.01)

(58) Field of Classification Search
USPC ......................................................... 192/201
See application file for complete search history.

(56) References Cited

U.S. PATENT DOCUMENTS

| 5,209,330 | A | 5/1993 | Macdonald | |
|---|---|---|---|---|
| 6,378,676 | B1 * | 4/2002 | Chasseguet et al. | 192/3.29 |
| 6,736,247 | B2 * | 5/2004 | Arhab et al. | 192/3.29 |
| 6,948,602 | B2 * | 9/2005 | Arhab et al. | 192/3.29 |
| 8,025,136 | B2 | 9/2011 | Uhler | |
| 2009/0139819 | A1 | 6/2009 | Jameson et al. | |

\* cited by examiner

*Primary Examiner* — Rodney H Bonck
(74) *Attorney, Agent, or Firm* — Simpson & Simpson, PLLC (57) ABSTRACT

A torque converter, including: a cover; a pump shell fixed to the cover; and a vibration damper with a plurality of springs, and a cover plate partially surrounding the springs. The torque converter includes a torque convert clutch with: a piston plate; and a drive plate with a first portion and a plurality of second portions including distal ends circumferentially aligned with the springs and circumferentially disposed between pairs of adjacent springs, and a plurality of centering protrusions extending radially outward beyond the distal ends or inward of the distal ends. The second portions are arranged to engage the springs to transmit the torque. When the torque converter is not rotating, the centering protrusions are free of contact with the cover plate. When the torque converter rotates at a rate greater than a threshold speed, the centering protrusions contact the cover plate to limit radial displacement of the drive plate.

14 Claims, 12 Drawing Sheets

PRIOR ART

Fig. 12
PRIOR ART

TORQUE CONVERTER WITH A CLUTCH CENTERING FEATURE

CROSS-REFERENCE TO RELATED APPLICATIONS

This application claims the benefit of U.S. Provisional Patent Application No. 61/607,148, filed Mar. 6, 2012, which application is incorporated herein by reference.

TECHNICAL FIELD

The present disclosure relates to a torque converter with a clutch centering feature, in particular a feature on a drive plate for the clutch that engages with a cover plate for a damper.

BACKGROUND

Figure 11:
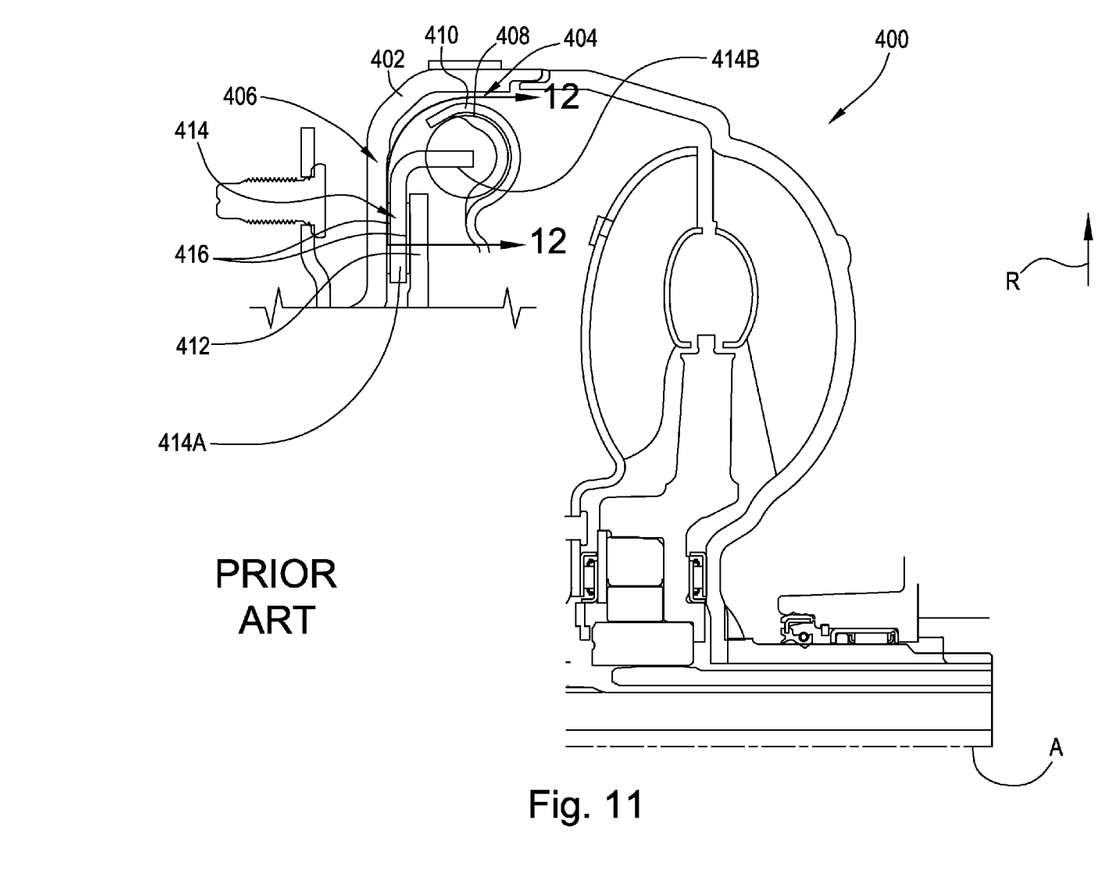
FIG. 11 is a partial cross-sectional view of a prior art torque converter.

FIG. 11 is a partial cross-sectional view of a portion of prior art torque converter 400.

Figure 12:
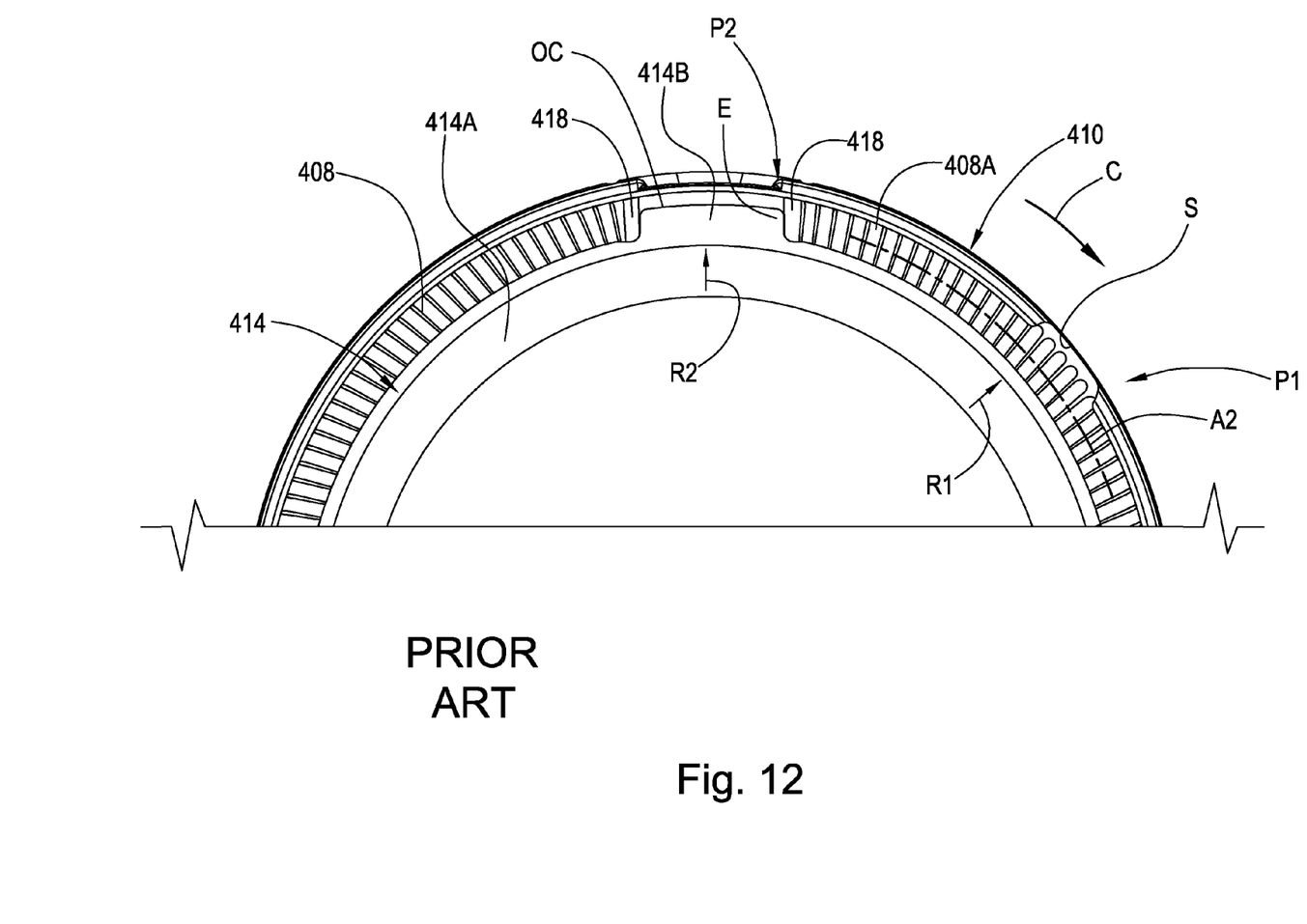
FIG. 12 is a partial front view of the torque converter of FIG. 11 generally along line 12-12 in FIG. 11 with a portion of the cover plate cut away.

FIG. 12 is a partial front view of the portion of torque converter 400 of FIG. 11 generally along line 12-12 in FIG. 11 with portion P1 of a cover plate cut away. The following should be viewed in light of FIGS. 12 and 13. Torque converter 400 includes cover 402 arranged to receive torque, vibration damper 404, and torque converter clutch 406. The vibration damper includes springs 408 at least partially surrounded by cover plate 410. The clutch includes piston plate 412, drive plate 414, and friction material 416. In some cases caps 418 are placed on the ends of the springs. Portion 414A of the drive plate is axially disposed between the piston plate and the cover and a plurality of portions 414B is circumferentially located between the springs.

In a torque converter, the torque converter clutch by-passes the fluid coupling of the pump and turbine when the differential pressure is increased on the "apply" side of the piston to close the clutch (clutch lock-up). During lock-up the clutch may be permitted to slip (spin at a specified differential speed to the cover temporarily or indefinitely. Drive plate 414 is used to transmit torque from the cover to springs 408 when piston 412 closes the clutch.

It is necessary for drive plate 414 to remain centered, or only minimally off-center, with respect to axis A for the torque converter, to ensure proper functioning of the clutch and the torque converter. The drive plate is not fixed to the cover or the piston, thus, the drive plate relies on contact with springs 408 for centering. When the torque converter is at rest, springs 408 are in the centered position shown in FIGS. 11 and 12. Compressive engagement of the driving plate and the springs determines the position of drive plate with respect to axis A for the torque converter. When torque converter 400 is at rest (not rotating), portions 414B are either in compressive engagement with the springs, or are separately from the springs by a narrow gap. In the latter case, once the clutch is closed and the drive plate begins rotating and transmitting torque from the cover (for example, in direction C) to the damper, the drive plate engages the springs. Thus, end E of portion 414B is engaged with spring 408A at rest or begins to engage and compress spring 408A in direction C when torque is applied and this engagement centers the drive plate.

As the damper begins to rotate at higher speed, springs 408 are forced outward by centrifugal force, for example in direction R1. When rotation exceeds a threshold value, the springs displace radially outward enough to engage surface S of the cover plate. Thus, the springs are being compressed at the same time as being pushed against surface S, which creates resistance as the springs are pushed along the surface by the compression. When the clutch is disengaged and the cover plate continues to rotate with sufficient speed, the resistance and the continued centrifugal force prevent the spring from decompressing. Thus, the spring remains displaced radially outward and the springs are no longer able to center the drive plate properly.

It should be understood that misalignment of the drive plate, or lack of centering of the plate, with respect to axis A can be either radially inward or radially outward (with respect to axis A), depending on the point of reference. FIG. 12 shows a view of the top portion of a cross-section in FIG. 11. If surface OC on the outer circumference of the drive plate displaces a certain distance in direction R2 (moves away from the axis), a point on the inner circumference of the drive plate, 180 degrees from point OC, will move toward the axis by the same distance. Thus, both radially outward and radially inward misalignment are present at the same time.

In one instance, the drive plate is displaced off-center with respect to A by the displacement of the springs and the springs are unable to relax as noted above. That is, the drive plate is in compressive engagement with the springs and the drive plate is "dragged" out of the desired alignment by the displacement of the springs. When the damper speed is reduced enough, the springs will relax; however, since the ends of the springs and ends E are no longer centered, end E is caught between the end of the spring and the portion of the cover at the end of the spring, for example, surface S in portion P2.

In another instance, the clutch is opened, the drive plate is displaced off-center by the displacement of the springs, and the springs are unable to relax as noted above. When the clutch is re-applied, friction material 416 may be damaged by the misalignment of the drive plate with axis A. Or, due to the misalignment with axis A or the catching of the drive plate in portion P2, there may be interference preventing the clutch from closing.

SUMMARY

According to aspects illustrated herein, there is provided a torque converter, including: an axis of rotation; a cover arranged to receive torque from an engine; a pump shell fixedly attached to the cover; and a vibration damper with a first plurality of springs, and a first cover plate partially surrounding respective circumferences for the first plurality of springs. The torque converter includes a torque convert clutch with: a piston plate; and a drive plate with a first portion axially disposed between the cover and the piston plate, a plurality of second portions including respective first distal ends circumferentially aligned with the first plurality of springs and circumferentially disposed between respective pairs of adjacent springs in the first plurality of springs, and a plurality of centering protrusions at least partially radially aligned with the cover plate. The centering protrusions: extend radially outward beyond the respective first distal ends or extend radially inward beyond the respective first distal ends. The plurality of first portions are arranged to engage the first plurality of springs to transmit the torque to the first plurality of springs. When the torque converter is not rotating, the plurality of centering protrusions is arranged to be free of contact with the first cover plate. When the torque converter rotates at a rate greater than a threshold speed, the plurality of centering protrusions is arranged to contact the first cover plate to limit the radial displacement of the drive plate with respect to the axis of rotation.

According to aspects illustrated herein, there is provided a torque converter, including: an axis of rotation; a cover arranged to receive torque from an engine; a pump shell fixedly attached to the cover; and a vibration damper with a plurality of springs and a cover plate partially surrounding respective circumferences for the plurality of springs. The torque converter includes a torque convert clutch with: a piston plate; and a drive plate with: a first portion axially disposed between the cover and the piston plate and free of a fixed connection to the cover or the piston plate; and a plurality of second portions arranged to transmit the torque to the first plurality of springs. Each second portion includes a respective first distal end circumferentially aligned with the plurality of springs and circumferentially disposed between a respective pairs of adjacent springs in the plurality of springs. Each second portion is in the form of a C-shape, opening radially inward, connecting the first portion to the respective first distal end. Each second portion includes a respective centering surface located radially outward of the respective first distal end. When the torque converter is not rotating, the respective centering surfaces are arranged to be free of contact with the first cover plate. When the torque converter rotates at a rate greater than a threshold speed, the respective centering surfaces are arranged to contact the first cover plate to limit radial displacement of the drive plate with respect to the axis of rotation.

According to aspects illustrated herein, there is provided a torque converter, including: a cover arranged to receive torque from an engine; a pump shell fixedly attached to the cover; and a vibration damper with: a plurality of springs; and a cover plate partially surrounding respective circumferences for the plurality of springs. The torque converter includes a torque convert clutch including: a piston plate; and a drive plate with: a first portion axially disposed between the cover and the piston plate; a plurality of second portions, arranged to transmit the torque to the plurality of springs, including respective first distal ends circumferentially aligned with the plurality of springs and circumferentially disposed between respective pairs of adjacent springs in the plurality of springs; and a plurality of third portions. The third portions: at least partially radially aligned with the cover plate; and including respective second distal ends located radially outward of the respective first distal ends. Contact between the respective second distal ends and the cover plate is arranged to limit radially outward displacement of the drive plate when the torque converter is rotating. The respective second distal ends are axially aligned with the first plurality of springs and wholly free of circumferential alignment with the first plurality of springs; or, the respective second distal ends are at least partially axially aligned with respective second portions and are in circumferential alignment with the first plurality of springs.

According to aspects illustrated herein, there is provided a torque converter, including: a cover arranged to receive torque from an engine; a pump shell fixedly attached to the cover; and a vibration damper with: a plurality of springs; and a cover plate partially surrounding respective circumferences for the plurality of springs and including a circumferentially disposed edge. The torque converter includes a torque convert clutch including: a piston plate; and a drive plate with: a first portion axially disposed between the cover and the piston plate; a plurality of second portions including respective first distal ends circumferentially aligned with the plurality of springs and circumferentially disposed between respective pairs of adjacent springs in the plurality of springs; and a plurality of third portions. The third portions: radially aligned with the cover plate; and including respective second distal ends located radially inward of the respective first distal ends. Contact between the respective second distal ends and the cover plate is arranged to limit radially outward displacement of the drive plate when the torque converter is rotating. The respective second distal ends are at least partially axially aligned with respective second portions and are in circumferential alignment with the first plurality of springs.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
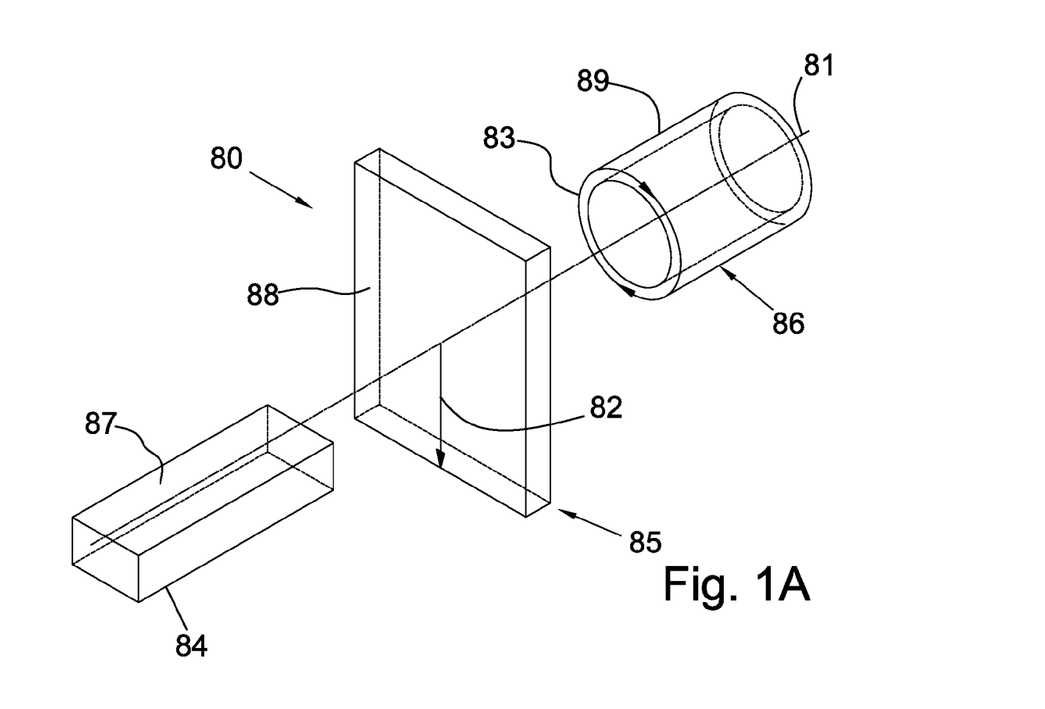
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
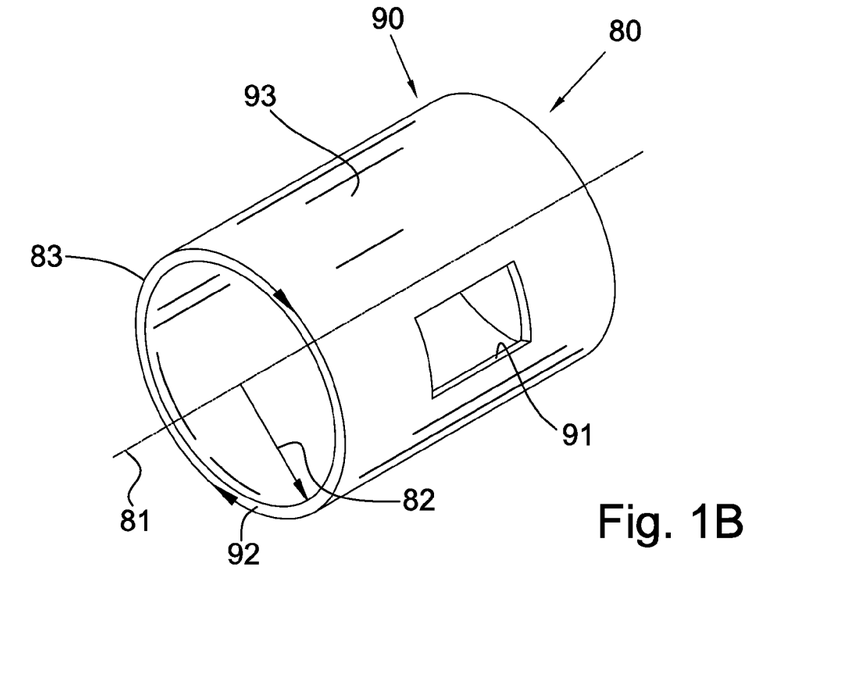
FIG. 1B is a perspective view of an object in the cylindrical coordinate system of FIG. 1A demonstrating spatial terminology used in the present application; and, FIG. 2 is a partial cross-sectional view of a torque converter with centering means circumferentially located between springs for a vibration damper.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
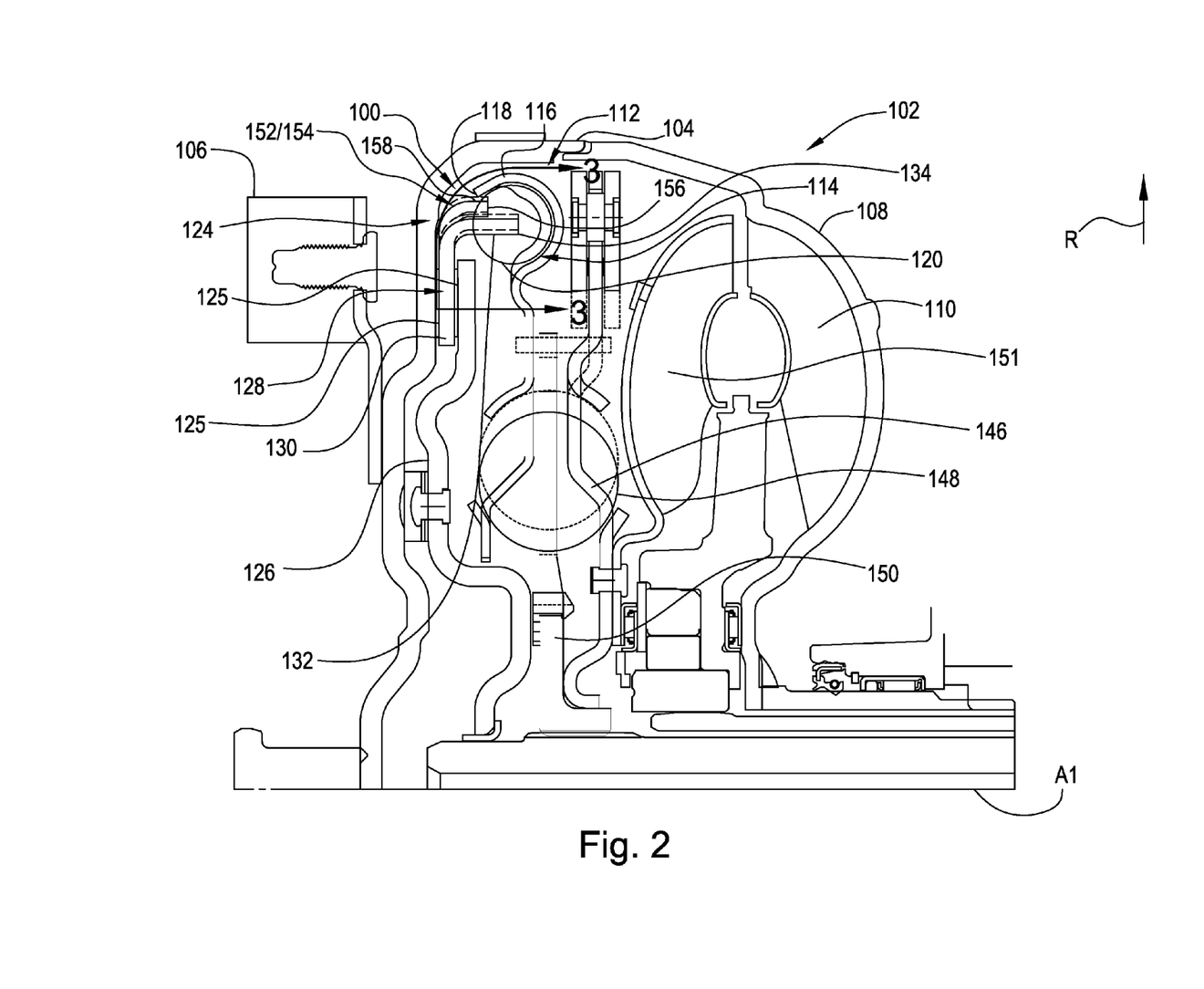

FIG. 2 is a partial cross-sectional view of a torque converter with centering means 100 circumferentially located between springs for a vibration damper.

Figure 3:
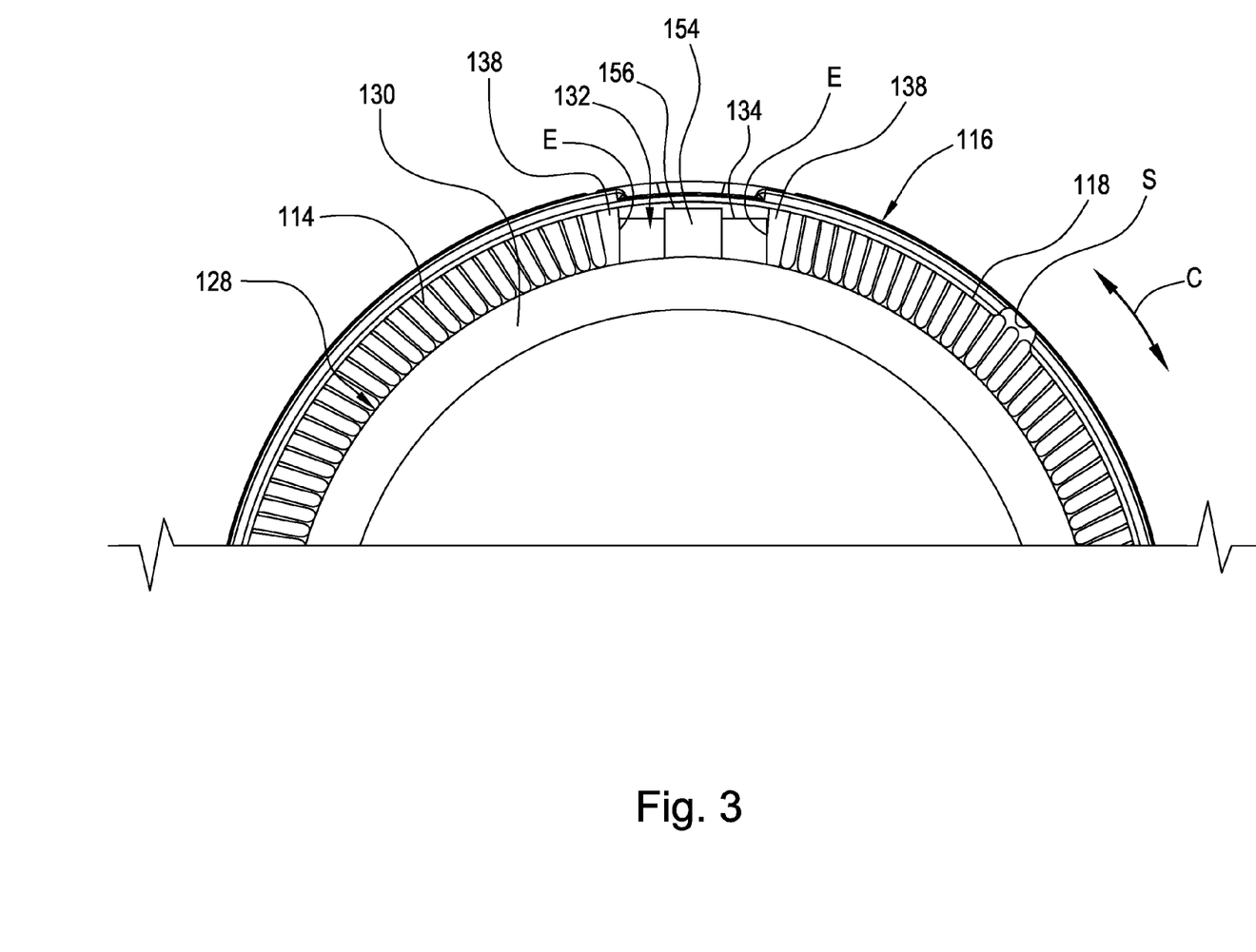
FIG. 3 is a partial front view of the torque converter of FIG. 2 generally along line 3-3 in FIG. 2.

FIG. 3 is a partial front view of the torque converter of FIG. 2 generally along line 3-3. The following should be viewed in light of FIGS. 2 and 3. Torque converter 102 includes cover 104 arranged to receive torque from engine 106 and pump shell 108, for pump 110, fixedly attached to the cover. The torque converter includes vibration damper 112 with springs 114 and cover plate 116 with circumferentially disposed edge 118. Cover plate 116 partially surrounds respective circumferences 120 for springs 114. The torque converter also includes torque converter clutch 124 with piston plate 126, friction material 125, and drive plate 128. The drive plate includes portion 130 axially disposed between the cover and the piston plate and a plurality of portions 132 including distal ends 134 circumferentially aligned with springs 114 and circumferentially disposed between respective pairs of adjacent springs 114.

Portions 132 are arranged to engage with springs 114 at ends E to transmit torque from the engine to cover plate 116 via the piston plate and portion 130 clamped by the piston plate and the cover when the clutch is closed. In an example embodiment, when the torque converter is at rest (not rotating), ends E are in compressive engagement with springs 114. In an example embodiment, when the torque converter is at rest (not rotating), ends E are separated from springs 114 by a narrow gap in circumferential direction C. In an example embodiment, caps 138 are located at the ends of springs 114 and ends E engage the caps.

In general, means 100 includes a plurality of centering protrusions radially aligned with plate 116. In some embodiments, the protrusions extend radially outward beyond portion 132 and distal ends 134, or radially inward of portion 132 and ends 134. In some embodiments, the protrusions are circumferentially disposed between respective pairs of springs. In some embodiments, the protrusions are axially aligned with springs 114. When the torque converter is not rotating, the protrusions are free of contact with cover plate 116. When the torque converter rotates at a rate high enough to cause springs 114 to displace radially outward, for example, to contact surface S of plate 116, the protrusions are configured to contact cover plate 116 to limit radial displacement of the drive plate with respect to axis of rotation A1 for the torque converter. That is, the protrusions are separated from the cover plate by a distance that is large enough to ensure that the protrusions do not contact the cover plate during normal operations (to avoid undesirable friction, losses, and damage that could be caused by such contact), but small enough to limit radial displacement of the drive plate to an acceptable level.

In an example embodiment, vibration damper 112 is a two-stage damper and springs 114 are for a radially outer stage. The damper includes cover plate 146 fixedly secured to cover plate 116, at least one spring 148 for a radially inner stage, and output flange 150. Springs 114 are arranged to transmit torque to flange 150 via cover plates 116 and 146 and spring 148. Turbine 151 is fixedly connected to cover plate 146 and transfers torque to the flange via spring 148.

In an example embodiment, the drive plate includes a plurality of portions 154 as shown in FIGS. 2 and 3. Portions 154 include the centering protrusions. That is, the centering protrusions are formed by portions 154. Portions 154 include distal end 156 disposed radially outward from distal ends 134. In an example embodiment, ends 156 are circumferentially aligned with springs 114, that is, at least part of portions 154 are at circumferentially disposed between respective pairs of springs 114.

When the torque converter is not rotating, portions 154 are arranged to be free of contact with cover plate 116 (solid lines in FIG. 2). When the torque converter rotates at a rate high enough to cause springs 114 to displace radially outward, for example, to contact surface S of plate 116, portions 154, in particular, surfaces 158, are configured to contact cover plate 116 (dashed lines in FIG. 2) to limit radial displacement of the drive plate with respect to axis A1.

Figure 4:
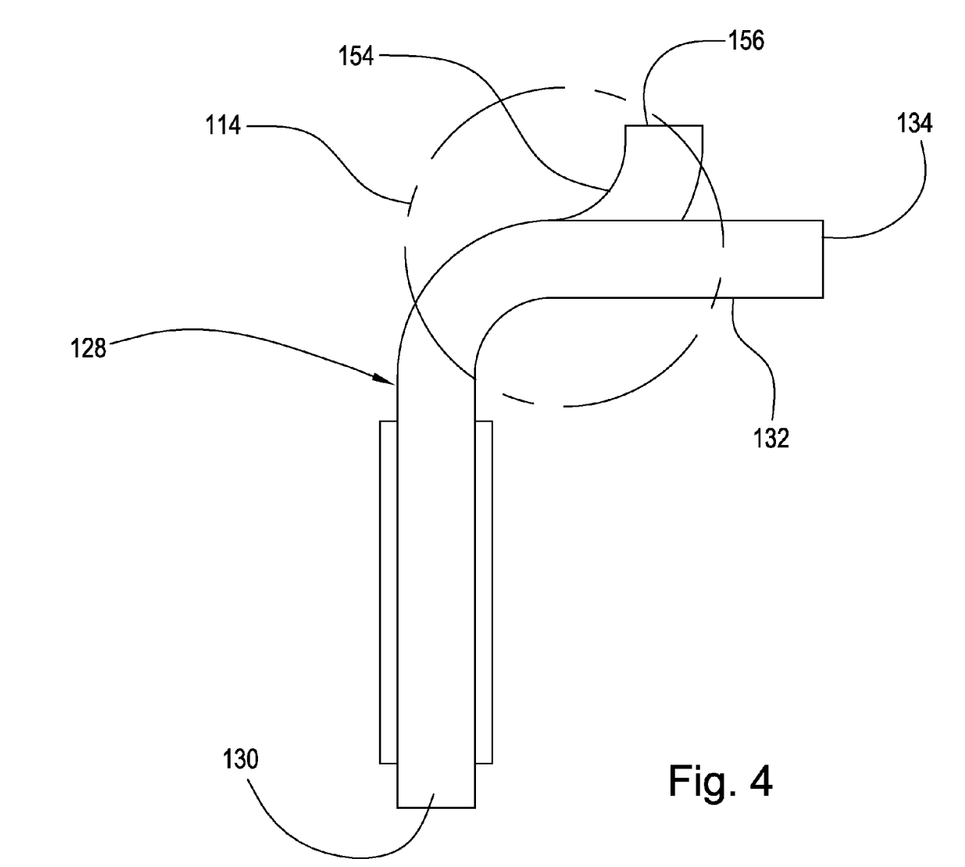
FIG. 4 is a partial cross-sectional view of a torque converter with centering means circumferentially located between springs for a vibration damper.

FIG. 4 is a partial cross-sectional view of torque converter 100 with centering means 100 circumferentially located between springs for a vibration damper. FIG. 4 shows a variation of portions 154 of FIGS. 2 and 3. In FIG. 4, end 156 of portions 154 is pointing radially outward. Therefore, it is end 156 that is arranged to contact cover plate 116 to minimize radial displacement of the drive plate.

Figure 5:
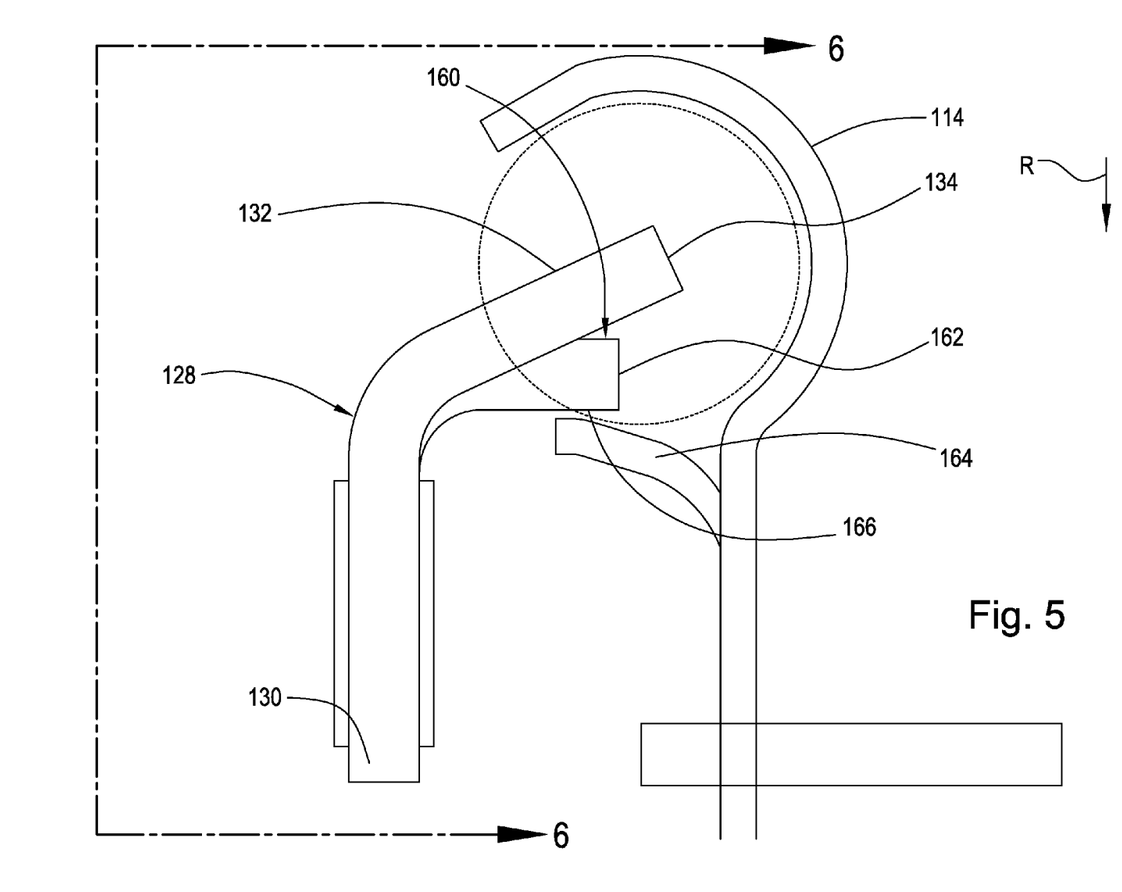
FIG. 5 is a partial cross-sectional view of a torque converter with centering means circumferentially located between springs for a vibration damper.

FIG. 5 is a partial cross-sectional view of a torque converter with centering means 100 circumferentially located between springs for a vibration damper.

Figure 6:
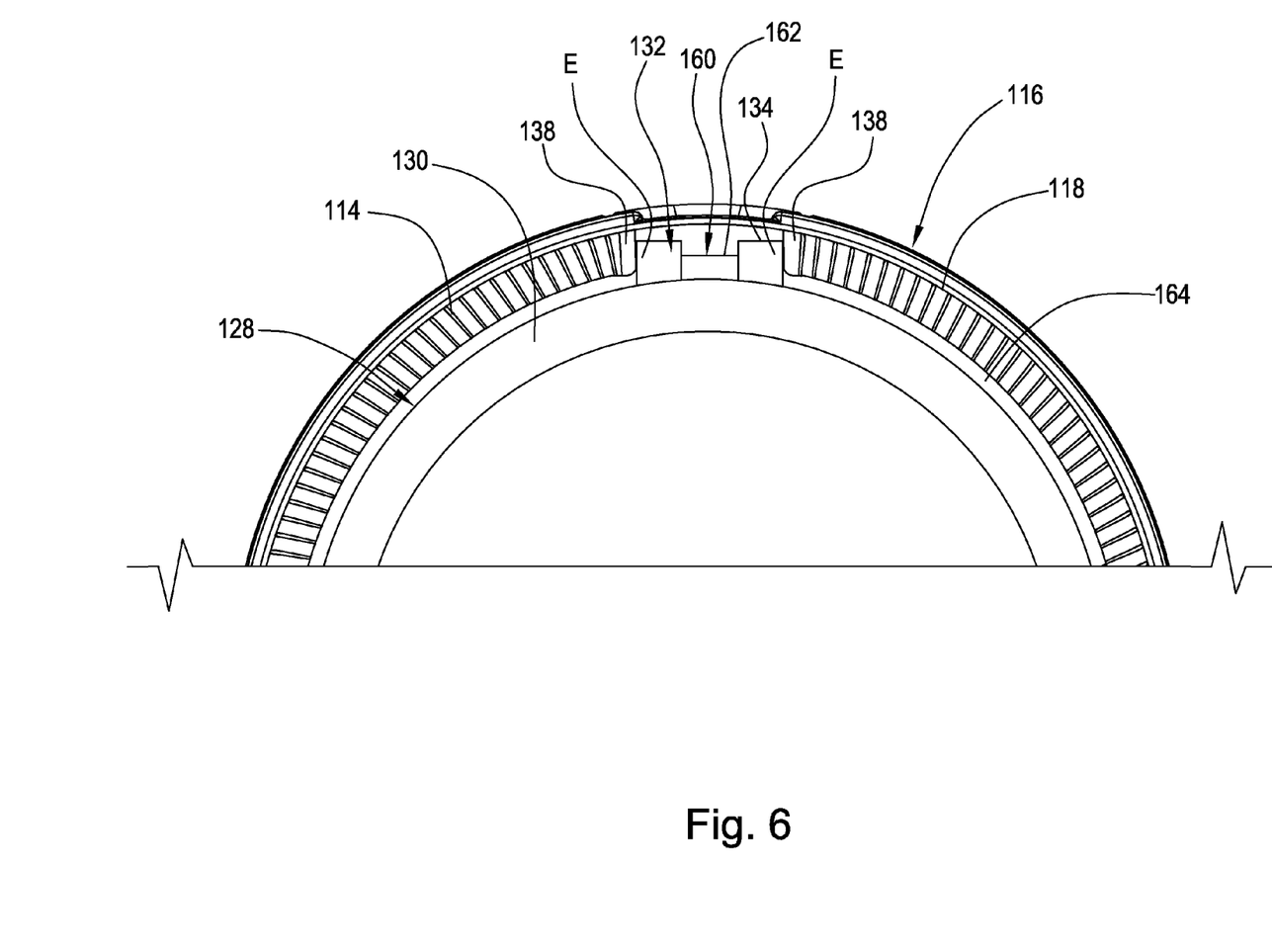
FIG. 6 is a partial front view of the torque converter of FIG. 5 generally along line 6-6 in FIG. 5.

FIG. 6 is a partial front view of the torque converter of FIG. 5 generally along line 6-6 in FIG. 5. The following should be viewed in light of FIGS. 5 and 6. In an example embodiment, the drive plate includes a plurality of portions 160 as shown in FIGS. 5 and 6. Portions 160 include the centering protrusions. That is, the centering protrusions are formed by portions 160. Portions 160 include distal end 162 disposed radially inward from distal ends 134. In an example embodiment, ends 162 are circumferentially aligned with springs 114, that is, at least part of portions 160 are at circumferentially disposed between respective pairs of springs 114. In FIG. 6, cover plate 116 includes lip 164.

When the torque converter is not rotating, portions 160 are arranged to be free of contact with cover plate 116. When the torque converter rotates at a rate high enough to cause springs 114 to displace radially outward, for example, to contact surface S of plate 116, portions 160, in particular, surfaces 166, are configured to contact cover plate 116, specifically lip 164, to limit radial displacement of the drive plate with respect to axis A1.

Figure 7:
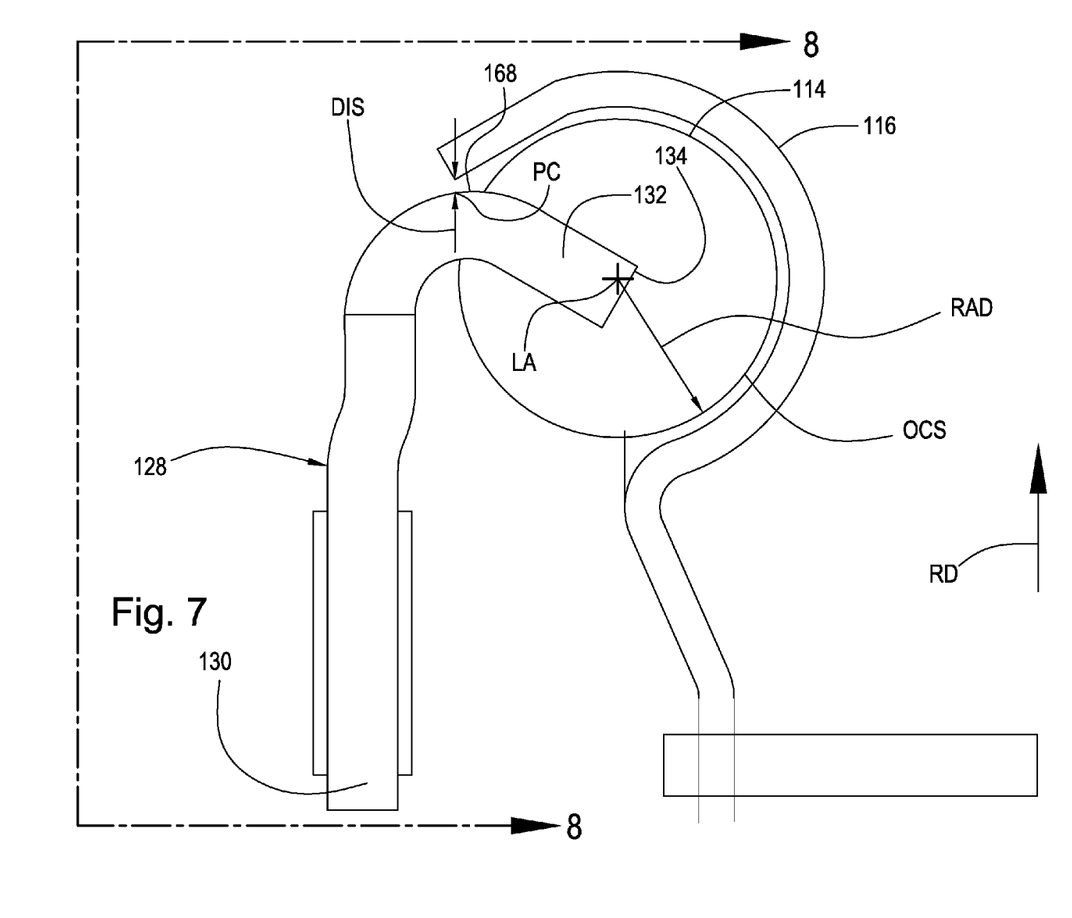
FIG. 7 is a partial cross-sectional view of a torque converter with centering means integral to driving portions of a drive plate.

FIG. 7 is a partial cross-sectional view of a torque converter with centering means 100 integral to driving portions of a drive plate.

Figure 8:
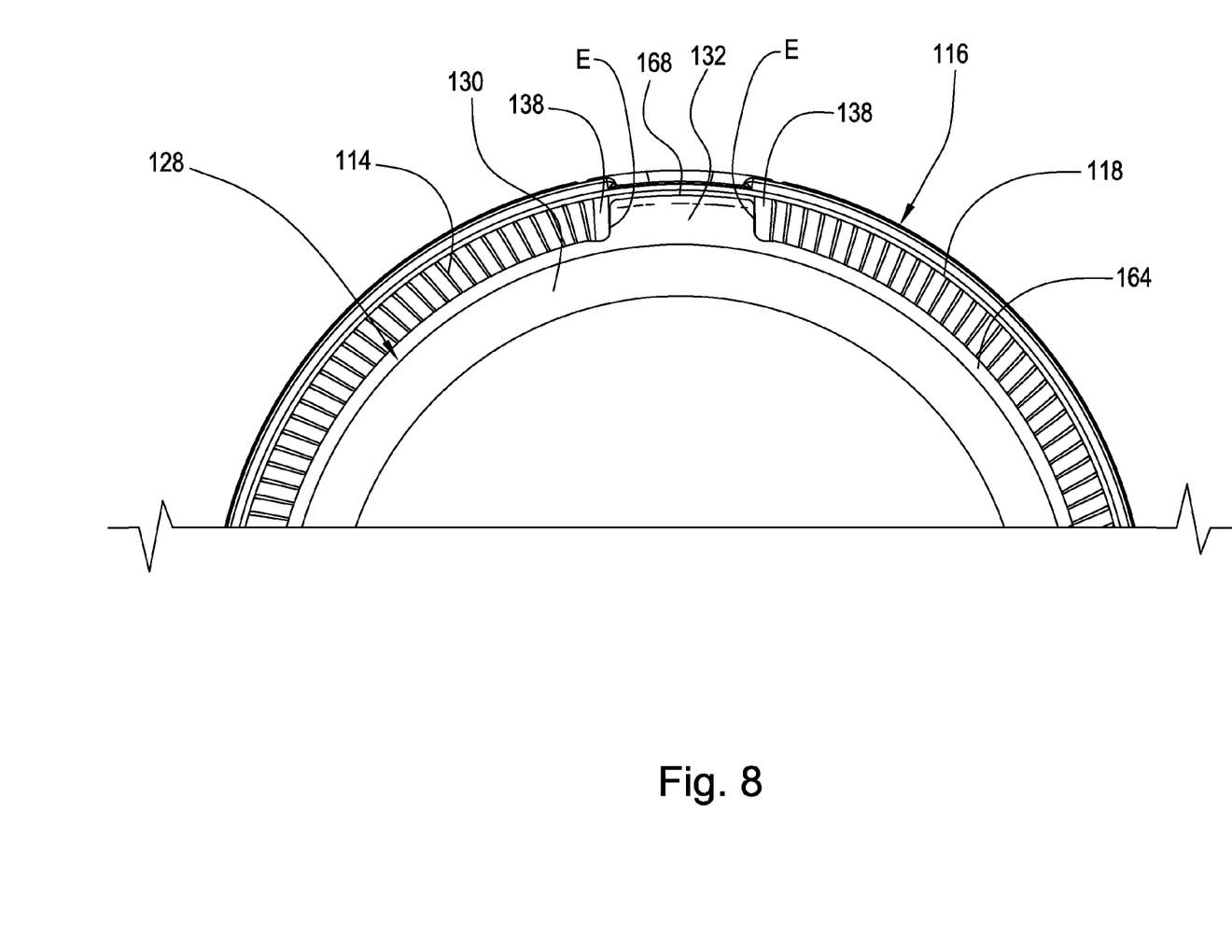
FIG. 8 is a partial front view of the torque converter of FIG. 7 generally along line 8-8 in FIG. 7.

FIG. 8 is a partial front view of the torque converter of FIG. 7 generally along line 8-8 in FIG. 7. The following should be viewed in light of FIGS. 7 and 8. In an example embodiment, portions 132 are in the form of respective "C" shapes from portion 130 to distal end 134. The "C" shapes open radially downward. The centering protrusions are formed by respective radially outermost portion, or surface, 168 of the "C" shapes, radially aligned with plate 116. Thus, the centering protrusions are integral to portions 132, and the centering protrusions are formed by portions 132, in particular surfaces 168.

When the torque converter is not rotating, portions 168 are arranged to be free of contact with cover plate 116. When the torque converter rotates at a rate high enough to cause springs 114 to displace radially outward, for example, to contact surface S of plate 116, portions 168 are configured to contact cover plate 116 to limit radial displacement of the drive plate with respect to the axis of rotation for the torque converter.

Figure 9:
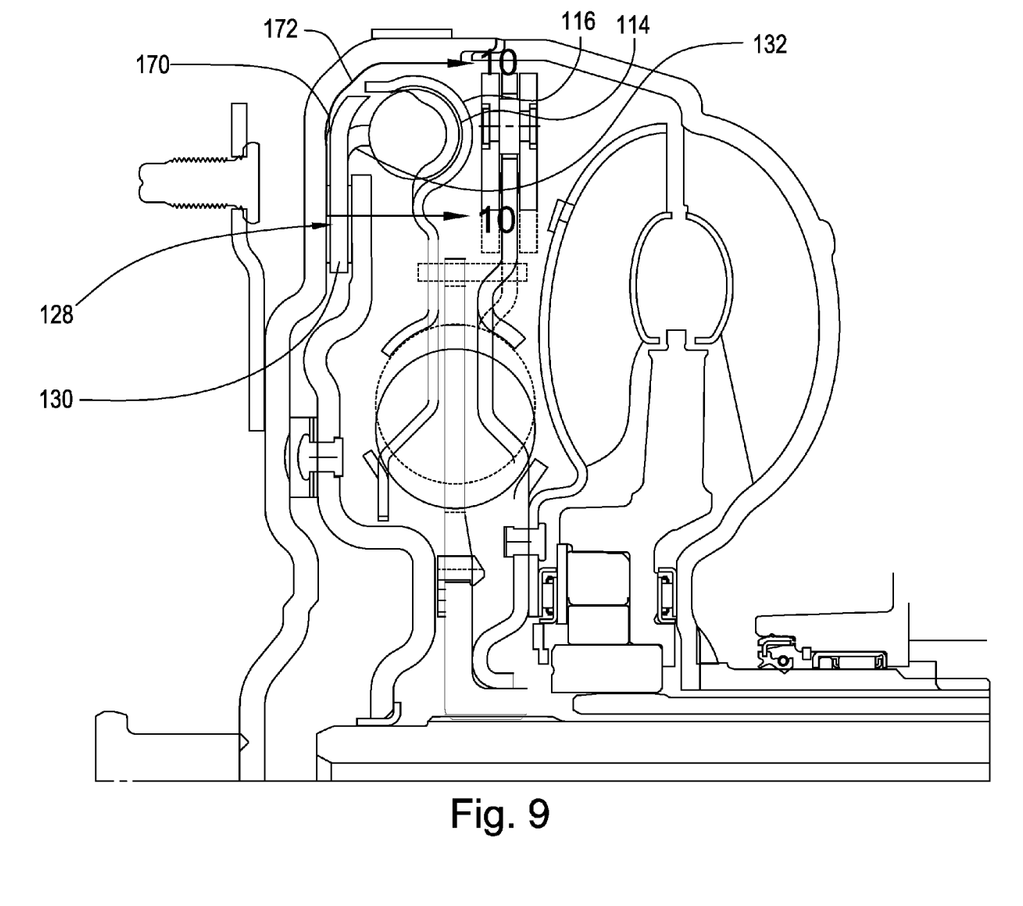
FIG. 9 is a partial cross-sectional view of a torque converter with centering means axially aligned with springs for a vibration damper.

FIG. 9 is a partial cross-sectional view of a torque converter with centering means 100 axially aligned with springs for a vibration damper.

Figure 10:
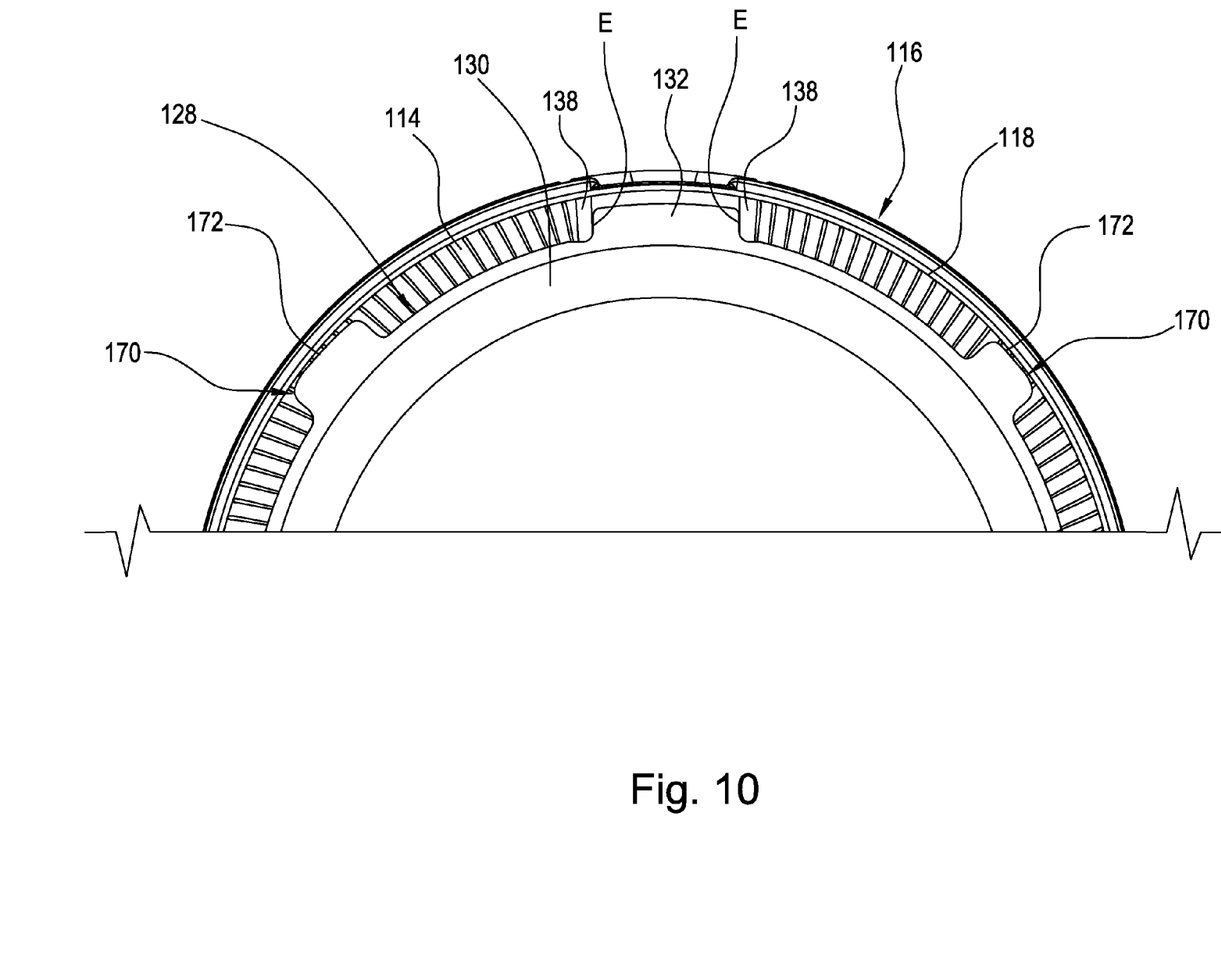
FIG. 10 is a partial front view of the torque converter of FIG. 9 generally along line 10-10 in FIG. 9.

FIG. 10 is a partial front view of the torque converter of FIG. 9 generally along line 10-10 in FIG. 9. The following should be viewed in light of FIGS. 9 and 10. In an example embodiment, drive plate 128 includes a plurality of portions 170 as shown in FIGS. 9 and 10. Portions 170 include the centering protrusions. That is, the centering protrusions are formed by portions 170. Portions 170 include distal end 172. Portions 170 are axially aligned with respective springs 114 and, in an example embodiment, are wholly circumferentially misaligned with springs 114. Thus, portions 170 do not contact springs 114. The drive plate is not limited to any particular number of portions 170 between respective pairs of springs 114.

When the torque converter is not rotating, portions 170 are arranged to be free of contact with cover plate 116. When the torque converter rotates at a rate high enough to cause springs 114 to displace radially outward, for example, to contact surface S of plate 116, portions 170, for example, surfaces 172, are configured to contact cover plate 116 to limit radial displacement of the drive plate with respect to axis A1.

In an example embodiment, for example, as shown in FIG. 7, springs 114 have a radius RAD, from longitudinal axis LA for the springs to an outer circumference OCS. Respective points PC for the centering protrusions, closest to plate 116 in radial direction RD, are separated at most from plate 116 by distance DIS. In various example embodiments, DIS is less than one quarter of RAD, one eighth of RAD, or one tenth of RAD.

Advantageously, the various configurations of centering protrusion described above for drive plate 128 engage with cover plate 116 when operation of torque converter 102 causes springs 114 to compress and displace radially outward, and then remain in the compressed, radially outward position when rotational speed of the torque converter is reduced. The contact of the protrusions with the cover plate limits the radial displacement of the drive plate, which would otherwise tend to be "dragged" further out of alignment by the movement of the springs. As noted above, limiting the radial displacement of the drive plate to acceptable limits also prevents portions of the drive plate from being wedged between the springs and the cover plate. When the springs relax, the springs then are able to guide the drive plate to the desired, aligned position with respect to the axis of rotation for the torque converter. Thus, the centering protrusions due not interfere with normal operation of a torque converter, while preventing the failures described supra.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A torque converter, comprising:
    an axis of rotation;
    a cover arranged to receive torque from an engine;
    a pump shell fixedly attached to the cover;
    a vibration damper with:
        a first plurality of springs; and,
        a first cover plate partially surrounding respective circumferences for the first plurality of springs; and,
    a torque converter clutch including:
        a piston plate; and,
        a drive plate with:
            a first portion axially disposed between the cover and the piston plate;
            a plurality of second portions including respective first distal ends circumferentially aligned with the first plurality of springs and circumferentially disposed between respective pairs of adjacent springs in the first plurality of springs; and,
            a plurality of centering protrusions at least partially radially aligned with the cover plate and:
                extending radially outward beyond the respective first distal ends; or,
                extending radially inward beyond the respective first distal ends, wherein:
                    the plurality of second portions are arranged to engage the first plurality of springs to transmit the torque to the first plurality of springs;
                    when the torque converter is not rotating, the plurality of centering protrusions is arranged to be free of contact with the first cover plate; and,
                    when the torque converter rotates at a rate greater than a threshold speed, the plurality of centering protrusions is arranged to contact the first cover plate to limit the radial displacement of the drive plate with respect to the axis of rotation.

2. The torque converter of claim 1, wherein:
    each second portion is in the form a C-shape, opening radially inward; and,
    each centering protrusion is formed by a respective radially outermost portion of a respective second portion.

3. The torque converter of claim 2, wherein each first distal end is radially inward of the respective radially outermost portion.

4. The torque converter of claim 1, wherein:
    the drive plate includes a plurality of third portions extending radially outward from the first portion of the drive plate; and,
    the plurality of third portions:
        includes the plurality of centering protrusions;

includes respective second distal ends disposed radially outward from the respective first distal ends; and, is arranged to contact the first cover plate to limit the radial displacement of the drive plate with respect to the axis of rotation.

5. The torque converter of claim 4, wherein the respective second distal ends are axially aligned with the first plurality of springs and wholly free of circumferential alignment with the first plurality of springs.

6. The torque converter of claim 5, wherein the plurality of third portions is circumferentially disposed between the plurality of second portions.

7. The torque converter of claim 4, wherein the respective second distal ends are circumferentially aligned with the first plurality of springs.

8. The torque converter of claim 1, wherein:
the drive plate includes a plurality of third portions, separate from the plurality of second portions; and,
the plurality of third portions:
includes the plurality of centering protrusions;
includes respective second distal ends disposed radially inward from the respective first distal ends; and,
is arranged to contact the first cover plate to limit the radial displacement of the drive plate with respect to the axis of rotation.

9. The torque converter of claim 8, wherein the respective second distal ends are circumferentially aligned with the first plurality of springs.

10. The torque converter of claim 1, wherein:
each spring in the first plurality of springs has a respective radius, from a longitudinal axis for the first plurality of springs to a respective outer circumference; and,
respective points for the plurality of centering protrusions, closest to the first cover plate in a radial direction, are separated at most from a circumferentially disposed edge of the first cover plate by a distance less than one quarter of the respective radius.

11. The torque converter of claim 1, wherein:
each spring in the first plurality of springs has a respective radius, from a longitudinal axis for the first plurality of springs to a respective outer circumference, of a first distance; and,
when the torque converter rotates at a rate greater than the threshold speed, the plurality of centering protrusions is arranged to contact the first cover plate to limit the radial displacement of the drive plate with respect to the axis of rotation to a third distance less than one quarter of the first distance.

12. The torque converter of claim 1, wherein:
the first plurality of springs is in compressive engagement with the respective first ends for the plurality of second portions; and,
the first portion of the drive plate is free of a fixed connection to the cover or the piston plate.

13. A torque converter, comprising:
an axis of rotation;
a cover arranged to receive torque from an engine;
a pump shell fixedly attached to the cover;
a vibration damper with:
a plurality of springs; and,
a cover plate partially surrounding respective circumferences for the plurality of springs; and,
a torque converter clutch including:
a piston plate; and,
a drive plate with:
a first portion axially disposed between the cover and the piston plate and free of a fixed connection to the cover or the piston plate; and,
a plurality of second portions arranged to transmit the torque to the first plurality of springs, each second portion:
including a respective first distal end circumferentially aligned with the plurality of springs and circumferentially disposed between a respective pairs of adjacent springs in the plurality of springs;
in the form of a C-shape, opening radially inward, connecting the first portion to the respective first distal end; and,
including a respective centering surface located radially outward of the respective first distal end, wherein:
when the torque converter is not rotating, the respective centering surfaces are arranged to be free of contact with the first cover plate; and,
when the torque converter rotates at a rate greater than a threshold speed, the respective centering surfaces are arranged to contact the first cover plate to limit radial displacement of the drive plate with respect to the axis of rotation.

14. A torque converter, comprising:
a cover arranged to receive torque from an engine;
a pump shell fixedly attached to the cover;
a vibration damper with:
a plurality of springs; and,
cover plate partially surrounding respective circumferences for the plurality of springs; and,
a torque converter clutch including:
a piston plate; and,
a drive plate with:
a first portion axially disposed between the cover and the piston plate;
a plurality of second portions, arranged to transmit the torque to the plurality of springs, including respective first distal ends circumferentially aligned with the plurality of springs and circumferentially disposed between respective pairs of adjacent springs in the plurality of springs; and,
a plurality of third portions:
at least partially radially aligned with the cover plate; and,
including respective second distal ends, wherein:
respective entireties of the respective second distal ends are located radially outward of the respective first distal ends:
contact between the respective second distal ends and the cover plate is arranged to limit radially outward displacement of the drive plate when the torque converter is rotating; and,
the respective second distal ends are axially aligned with the first plurality of springs and wholly free of circumferential alignment with the first plurality of springs.

* * * * *